July 24, 1951  B. DENZLER  2,561,788
COLLET CHUCK
Filed May 12, 1947
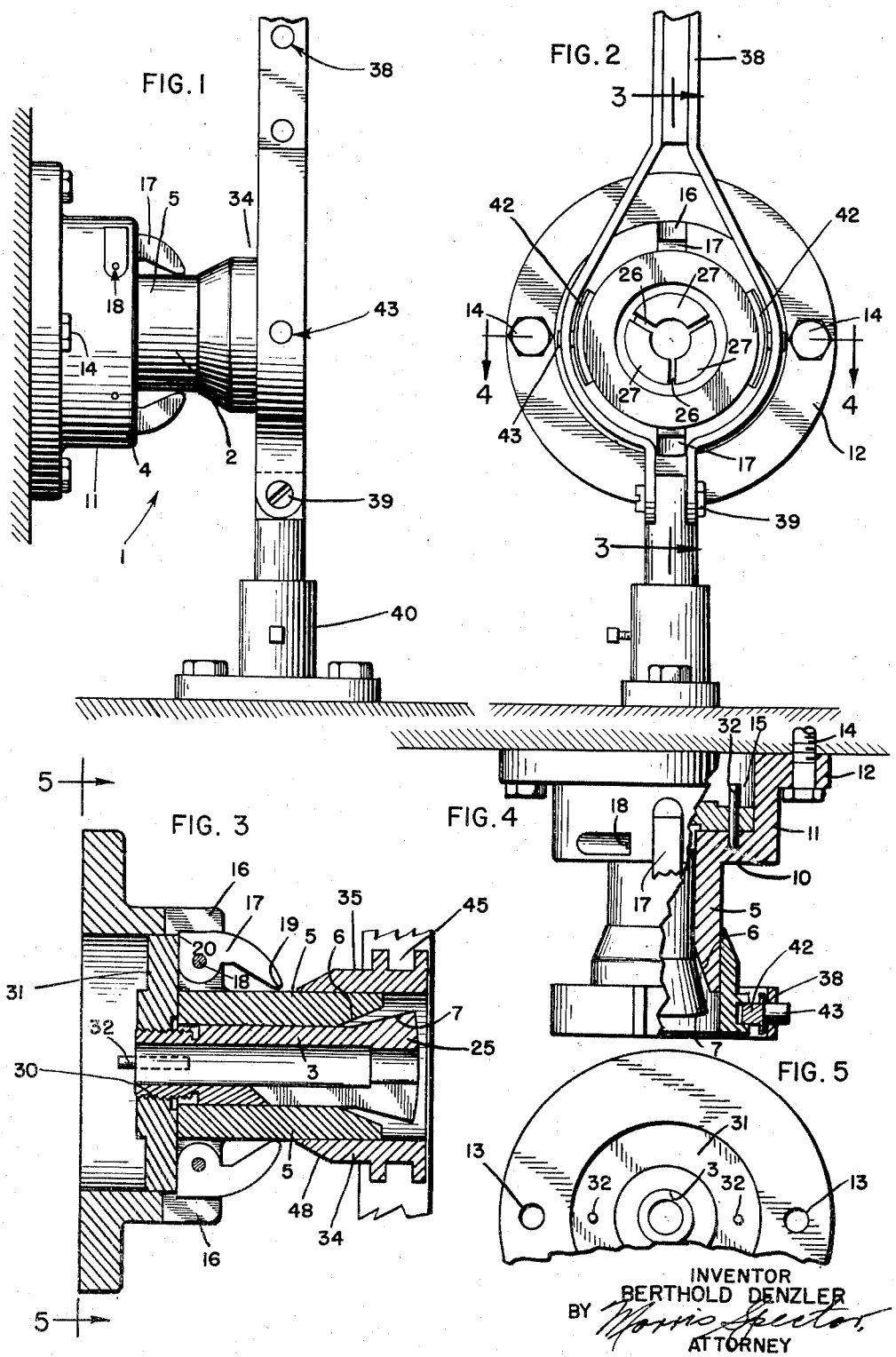
INVENTOR
BERTHOLD DENZLER
BY Morris Spector
ATTORNEY Patented July 24, 1951

2,561,788

UNITED STATES PATENT OFFICE 2,561,788

COLLET CHUCK

Berthold Denzler, Chicago, Ill., assignor to Davos Products Co., Chicago, Ill., a partnership consisting of Berthold Denzler and Filip Brandhandler Application May 12, 1947, Serial No. 747,543

3 Claims. (Cl. 279—50)

This invention relates to collet chucks.

It is one of the objects of the present invention to provide a collet chuck which is adapted for use on ordinary lathes and which is simple and economical of construction and reliable in action.

It is a further object of the present invention to provide a collet chuck of the above mentioned character which has a minimum number of parts that are movable with respect to one another in the actuation of the collet from its gripping to its non-gripping position.

It is a still further object of the present invention to provide a collet chuck so constructed as to afford a minimum interference with the working of the machine on which the chuck is provided.

The attainment of the above and further objects of the present invention will be apparent from the following specification taken in conjunction with the accompanying drawing forming a part thereof.

In the drawing:

Figure 1 is a side view of a collet chuck embodying the present invention;

Figure 2 is a front view thereof;

Figure 3 is a sectional view taken along the line 3—3 of Figure 2;

Figure 4 is a fragmentary sectional view taken along the line 4—4 of Figure 2; and Figure 5 is a rear view taken along the line 5—5 of Figure 3.

Reference may now be had more particularly to the drawing wherein like reference numerals designate like parts throughout.

The collet chuck is indicated in general by the reference numeral 1 and comprises a collet-receiving socket 2 for receiving a collet 3. The collet-receiving socket 2 comprises a cylindrical sleeve portion 5 having a tapered surface 6 for cooperating with the correspondingly tapered surface 7 on the collet 3. The sleeve has a circular peripheral flange 10 integral therewith and from which there extends a cylindrical portion 11 coaxial with the sleeve 5 and which has a mounting flange 12 which has bolt holes 13 whereby it may be mounted by means of a series of bolts 14 to the rotatable portion of a machine such as a lathe. The rear surface of the flange 10 and the inner surface of the cylindrical portion 11 together form a pocket 15 for a purpose to be more fully set forth as this description proceeds. The cylindrical portion of the sleeve has a pair of slots 16—16 milled therein in each of which is pivotally mounted a dog 17 as by a pivot pin 18. Each dog includes a rounded nose portion 19 and a back camming surface 20.

The collet 3 consists of a steel tube the forward portion of which has an enlarged head 25 on the outside of which the tapered surface 7 is formed. The forward portion of the collet tube has three slits 26 therein spaced 120° apart and extending for a substantial distance along the collet, thus dividing the head 25 into three jaws, as is usual. The back of the tubular portion 3 of the collet is screw threaded as indicated at 30. The collet is inserted through the socket 2 and threads into a holding plate 31. The holding plate is held against turning in any desired manner, as by a pair of pins 32 that are held on the back surface of the circular peripheral flange 10 and extend through slightly oversized holes in the holding plate. The collet threads into the plate 31 so that thereafter the collet 3 together with the plate 31 are movable as a unit in a direction axially of the collet.

Means is provided for moving the collet axially a short distance to cause the collet jaws to grip or release a piece of work that may be inserted into the collet. The means for moving the collet comprises a short ring or sleeve 34 that makes a sliding fit on the smooth circular exterior of the sleeve 5 of the collet-receiving socket. The sleeve 34 is shiftable axially of the sleeve 5 as by a handle 38 pivoted at 39 to a standard 40 that is bolted to the lathe. The handle 38 is bifurcated and embraces the ring or sleeve 34 and is provided with a pair of arcuate shoes 42—42 that are pivoted to the handle by pivot pins 43 that are part of the shoes. The shoes enter and ride in a circular outwardly facing channel-shaped groove 45 in the ring or sleeve 34. The pins 43 are slidable lengthwise in the holes in the handle. When the handle 38 is moved from the position illustrated in Figure 1 in a counter-clockwise direction about the pivot 39 as a center it causes the shoes 42 to engage the flanges of the channel 45 and move the sleeve 34 to the left. Movement of the sleeve 34 to the left causes an inclined camming surface 48 thereof to ride between the outer periphery of the sleeve 5 and the rounded noses 19 of the dogs 17 and cause the dogs to swing about their respective pivots 18. The back camming surface 20 of each dog then forces the plate 31 in a direction to the left as seen in Figure 3, which holding plate draws the collet 3 leftward with it thus forcing the three jaws 27—27—27 towards one another to grip a piece of stock that may have been inserted into the chuck. A reverse movement of the handle causes the ring or sleeve 34 to be retracted from under the dogs and permits the collet to be shifted in the sleeve 5 in a direction to the right as seen in Figure 3 and thus permits the work or stock to be withdrawn from between the jaws of the collet.

When the dogs 17 are in the position illustrated in Figure 3 the collet 3 may be manually rotated with respect to the plate 31 thereby to effect an adjustment of the collet with respect to the collet-receiving sleeve 5, thus varying the extent to which the three jaws are forced towards one another by the full movement of the handle 38, as may be necessary for gripping different sizes of work stock.

During operation of the lathe the ring or sleeve 34 rotates with the sleeve 5 so that the ring 34, the sleeve 5, the dogs 17 and the collet 3 with its associated plate 31 all turn as one integral unit. When the sleeve 34 is moved to its work chucking position the amount of movement is generally such that the rounded nose portions of the dogs 17 ride up on the cylindrical surface 35 of the ring 34. This surface is coaxial with the longitudinal axis of the collet and of the circular sleeve 5 so that the force of the dogs on the ring or sleeve 34 has no component tending to shift the ring or sleeve to the right, that is, to its releasing position. However, when the work is of larger diameter the rounded nose portions of the dogs may not quite reach the cylindrical surface 35 and a gripping action is obtained by the collet nevertheless.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A collet chuck comprising a collet receiving socket including a sleeve, a collet extending thereinto, said sleeve having a peripherally extending mounting flange at the rear thereof and having an enlarged pocket open at the rear thereof and surrounded by the flange, said collet having a threaded end extending into said pocket, a plate in said pocket and held against rotation therein but movable therein axially of the sleeve, said threaded end of the collet being threaded into the plate, and a plurality of dogs pivoted on the flange and extending forward thereof and each having a camming surface engaging the plate and operable for moving it in said pocket.

2. A collet chuck comprising a collet receiving socket including a sleeve, a collet extending thereinto, said sleeve having a peripherally extending mounting flange at the rear thereof and having an enlarged pocket open at the rear thereof and surrounded by the flange, said collet having a threaded end extending into said pocket, a plate in said pocket and held against rotation therein but movable therein axially of the sleeve, said threaded end of the collet being threaded into the plate, a plurality of dogs pivoted on the flange end extending forward thereof and each having a camming surface engaging the plate for moving it in said pocket, a ring slidable on said socket and having an inclined surface adapted to engage the dogs for pivoting them into camming engagement with the plate as the ring is moved on the socket, and means for moving the ring lengthwise of the socket.

3. A collet chuck comprising a collet receiving socket including a sleeve, a collet extending thereinto, said sleeve having a peripherally extending mounting flange at the rear thereof and having an enlarged pocket open at the rear thereof and surrounded by the flange, said collet having a threaded end extending into said pocket, a plate in said pocket and held against rotation therein but movable therein axially of the sleeve, said threaded end of the collet being threaded into the plate, a plurality of dogs pivoted on the flange and extending forwardly thereof and each having a camming surface engaging the plate for moving it in said pocket, a ring slidable on said socket and having an inclined surface adapted to engage the dogs for pivoting them into camming engagement with the plate as the ring is moved on the socket, and means for moving the ring lengthwise of the socket, said ring also having an outer cylindrical surface into which the wedge-shaped surface merges and which cylindrical surface is, upon full movement of the ring, moved to a position engaged by the dogs whereby the force of the dogs on the ring has no component in a direction axially of the ring.

BERTHOLD DENZLER.

REFERENCES CITED

The following references are of record in the file of this patent:

UNITED STATES PATENTS

| Number | Name | Date |
|---|---|---|
| 347,167 | Elmer | Aug. 10, 1886 |
| 594,077 | Gauthier | Nov. 23, 1897 |
| 1,465,257 | Drissner | Aug. 21, 1923 |
| 1,864,786 | Wilkins | June 28, 1932 |
| 2,386,960 | Jellinek | Oct. 16, 1945 |